United States Patent [19]
Batchelder et al.

[11] Patent Number: 5,866,058
[45] Date of Patent: Feb. 2, 1999

[54] METHOD FOR RAPID PROTOTYPING OF SOLID MODELS

[75] Inventors: John Samuel Batchelder, Somers, N.Y.; Steven Scott Crump, Wayzata, Minn.

[73] Assignee: Stratasys Inc., Eden Prairie, Minn.

[21] Appl. No.: 862,933

[22] Filed: May 29, 1997

[51] Int. Cl.$^6$ ................................................. B29C 41/02
[52] U.S. Cl. ..................... 264/237; 264/308; 364/468.26
[58] Field of Search .................................... 264/237, 308, 264/401, 497; 364/468.26

[56] References Cited

U.S. PATENT DOCUMENTS

| | | | |
|---|---|---|---|
| 4,749,347 | 6/1988 | Valavaara | 425/135 |
| 5,121,329 | 6/1992 | Crump | 364/468.26 |
| 5,141,680 | 8/1992 | Almquist | 264/401 |
| 5,545,367 | 8/1996 | Bae et al. | 264/401 |

*Primary Examiner*—Leo B. Tentoni
*Attorney, Agent, or Firm*—Ohlandt, Greeley, Ruggiero & Perle

[57] ABSTRACT

Data corresponding to a desired shape of a prototype is transmitted to a rapid prototyping system. The system calculates a sequence for extruding flowable material that thermally solidifies so as to create the desired geometric shape. A heated flowable modeling material is then sequentially extruded at its deposition temperature into a build environment that maintains the volume in the vicinity of the newly deposited material in a deposition temperature window between the material's solidification temperature and its creep temperature. Subsequently the newly extruded material is gradually cooled below its solidification temperature, while maintaining temperature gradients in the geometric shape below a maximum value set by the desired part's geometric accuracy.

11 Claims, 3 Drawing Sheets

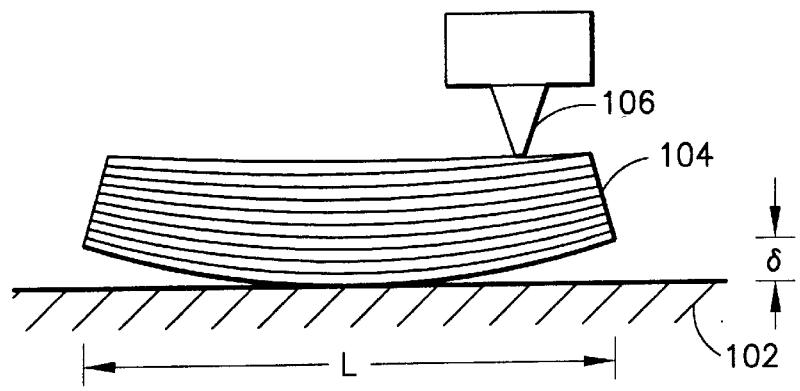
FIG.1
PRIOR ART
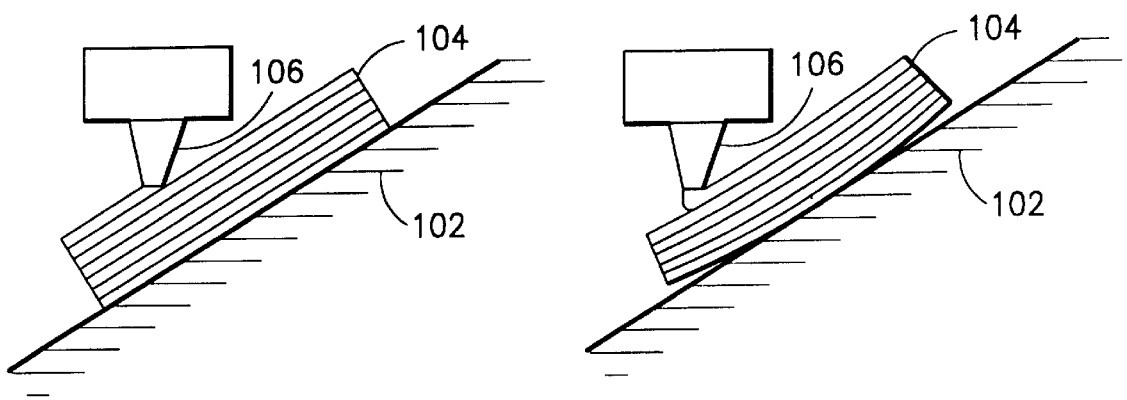
FIG.2A
PRIOR ART
FIG.2B
PRIOR ART

METHOD FOR RAPID PROTOTYPING OF SOLID MODELS

FIELD OF THE INVENTION

This invention relates to the rapid prototyping of solid models from thermoplastic materials and, more particularly, to a method for rapid prototyping of models wherein curl and other modes of distortion are minimized.

BACKGROUND OF THE INVENTION

Rapid prototyping of models includes the making of three dimensional solid objects in accordance with a specified design, with the design usually comprising mathematical data from a three dimensional solid computer-aided design system. Rapid prototyping systems create solid objects by:

sequential photopolymerization of layers of a monomer, milling away material, laser fusing of particulate, sequential extrusion of a thermoplastic, laminating scribed layers of paper, jetting thermally solidifiable wax or metal, laser enhanced chemical vapor deposition, brazing together pre-machined plates, by jetting binder onto ceramic powders, other techniques.

A preferred rapid prototyping system creates solid models by depositing thermally solidifiable materials. In these processes, a flowable material is sequentially deposited on a seed, a substrate, or on previously deposited thermoplastic material. The material solidifies after it is deposited and is thus able to incrementally create a desired form. Examples of thermally solidifiable systems include fused deposition modeling, wax jetting, metal jetting, consumable rod arc welding, and plasma spraying.

Since most deposition materials change density with temperature, especially as they transition from a fluid to a solid, thermally solidifiable material rapid prototyping systems share the challenge of minimizing geometric distortions of the product prototypes that are produced by these density changes. Thermally solidifiable systems are subject to both "curl" and "plastic deformation" distortion mechanisms. Curl is manifest by a curvilinear geometric distortion which is induced into a prototype during a cooling period. The single largest contributor to such a geometric distortion (with respect to prototypes made by the current generation of rapid prototyping systems which utilize a thermally solidifiable material) is a change in density of the material as it transitions from a relatively hot flowable state to a relatively cold solid state.

For the simple case where an expansion coefficient is independent of temperature, the nature and magnitude of geometric distortion of sequentially applied planar layers can be estimated. Assume a linear thermal gradient $dT/dz$ is present in a material when it is formed into a plate of thickness h in the z direction, and that the material has a constant thermal expansion coefficient $\alpha$. The z direction is generally orthogonal to a support surface on which the plate is constructed. If the plate is subsequently allowed to come to some uniform temperature, it will distort, without applied stress, to form a cylindrical shell of radius r where:

$$r = (\alpha^* dT/dz)^{-1} \tag{1}$$

Curl C is defined as the inverse of the radius of curvature: $C = 1/r$. An example of positive curl is shown in FIG. 1.

Sequential layers of a thermoplastic material 104 are deposited on a base 102, using a moving extruder 106. As is typical in thermally solidified rapid prototypes, a series of layers are deposited sequentially in the z direction (i.e., the direction orthogonal to base 102), with the last layer deposited always having the highest temperature. Such an additive process typically results in a geometrically accurate part which contains a thermal gradient. As the part subsequently cools and becomes isothermal, the part distorts as a result of a curling of the ends of long features.

If it is desired to make prototypes with a maximum horizontal length L and a maximum allowable geometric distortion $\delta$, the maximum allowable temperature gradient within the part, as it is being formed, is as follows:

$$(dT/dz)_{max} = 8\delta/L^2\alpha \tag{2}$$

For example, to make 12 inch long parts to a tolerance of 0.030 inches, with a thermoplastic having an expansion coefficient of $90 \times 10^{-6}$ per degree Centigrade, the maximum allowable thermal gradient in the part during formation is 18° C. per inch. Unfortunately, thermal gradients are usually much greater than 18° C. per inch in the vicinity of a part where fluid material is solidifying.

Techniques exist to reduce the impact of curl. One technique involves the heating of the ambient build environment to reduce the possible temperature differences. Another technique is to carefully choose build materials which exhibit lowest possible thermal expansion coefficients. Yet another technique is to deposit the build material at the lowest possible temperature.

Plastic deformation is a second phenomenon, unrelated to the thermal expansion coefficient, of a build material which can also produce distortion in a thermally solidifying prototype. Consider the fused deposition modeling apparatus shown in FIGS. 2A and 2B. In both cases, a flowable material flows out of a heated nozzle 106 and is solidifying on previously deposited, solidified material 104. In FIG. 2A, nozzle 106 is moving upwardly as it deposits material 104, while in FIG. 2B nozzle 106 moves downwardly. In FIG. 2A, the material emerging from nozzle 106 sees less than a 90° bend as it is deposited, while in FIG. 2B it sees more than a 90° bend. Experimentally, more distortion arises from the configuration of FIG. 2B than from FIG. 2A. Further, the effect is more pronounced for lower deposition temperatures. This is attributed to inelastic deformation of the elastic component of the material. The distortion is similar to the curl created in a piece of paper by dragging the paper over a sharp right angle bend.

The art is replete with various solid modeling teachings. For instance, U.S. Pat. No. 5,121,329 to Crump, and assigned to the same Assignee as this Application, describes a fused deposition modeling system. While the Crump system incorporates a heated build environment, it requires that the deposited material be below its solidification temperature, as subsequent layers of material are added. U.S. Pat. No. 4,749,347 to Vilavaara and U.S. Pat. No. 5,141,680 to Almquist et al. describe rapid prototyping systems that incorporate flowable, thermally solidifying material. Both patents teach a build environment that is maintained at and below the solidification temperature of the extrusion material.

Accordingly, it is an object of the invention to provide an improved method for rapid prototyping, wherein the method employs a thermally solidifiable material.

It is another object of the invention to provide an improved method for rapid prototyping which improves the geometric accuracy and fidelity of resulting parts.

It is a further object of the invention to provide an improved method for rapid prototyping which uses thermally solidifiable material which achieves reductions in internal stresses created in prototypes.

SUMMARY OF THE INVENTION

Data corresponding to a desired shape of a prototype is transmitted to a rapid prototyping system. The system calculates a sequence for extruding flowable material that thermally solidifies so as to create the desired geometric shape. A heated flowable modeling material is then sequentially extruded at its deposition temperature into a build environment that maintains the volume in the vicinity of the newly deposited material in a deposition temperature window between the material's solidification temperature and its creep temperature. Subsequently the newly extruded material is gradually cooled below its solidification temperature, while maintaining temperature gradients in the geometric shape below a maximum value set by the desired part's geometric accuracy.

The invention further includes a method for making a three-dimensional physical object of a predetermined shape. The steps of the method are as follows
  a) computing a sequence of commands required to produce the predetermined shape of the three-dimensional physical object;
  b) dispensing a thermally solidifiable material in a fluid state from an extruder into a build environment as prescribed by the sequence of commands;
  c) maintaining during step b) the build environment, at least in a vicinity of the extruder, within a predetermined temperature range, the temperature range being above a solidification temperature of the thermally solidifiable material;
  d) simultaneously with the dispensing step b) and in response to the sequence of commands, mechanically generating relative movement between the extruder and the build environment, so that the material accumulates to form the three-dimensional physical object;
  e) concurrently with step d), adjusting temperatures within the build environment differentially so that the solidifiable material, upon which additional solidifiable material has accumulated, is cooled below a solidification temperature thereof; and
  f) further solidifying the object by cooling the object below the solidification temperature.

It is preferred that the thermally solidifiable material is a thermoplastic which exhibits a glass transition temperature and that step c) maintains the temperature of the build environment below the glass transition temperature.

BRIEF DESCRIPTION OF THE DRAWINGS

FIG. 1 shows typical prototype distortion due to thermal shrinkage of a solidifiable material.

FIGS. 2A and 2B shows the distortion effect which arises from inelastic deformation of the elastic component of a solidifiable material.

DETAILED DESCRIPTION OF THE INVENTION

This invention is based on the recognition that there is a transition region between a material's fluid state and it's solid state. How broad a temperature range that encompasses the transition region varies with the type of material being extruded. Crystalline materials will tend to have sharper transition regions, while glassy materials will exhibit broader transition regions. However, crystalline materials in the solid phase have temperature-dependent creep rates that increase markedly as the melting point of the material is approached. Hereafter, the description will primarily consider the characteristics of glassy thermoplastics, however the invention is also applicable to mixed phase and crystalline materials.

Figure 3A:
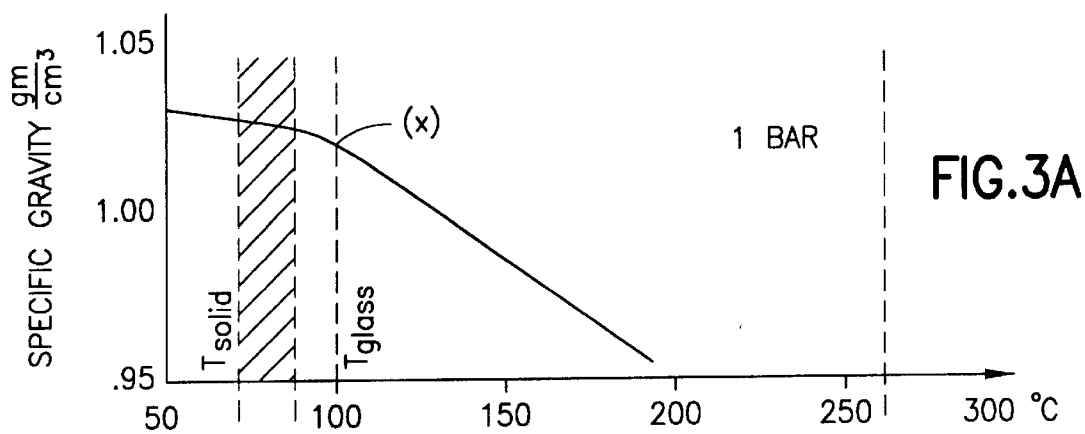
FIGS. 3A, 3B and 3C illustrate plots of changes in specific gravity, stress relaxation modulus and viscosity versus temperature for an ABS (acrylonitrile-butadiene-styrene) thermoplastic.
Figure 3B:
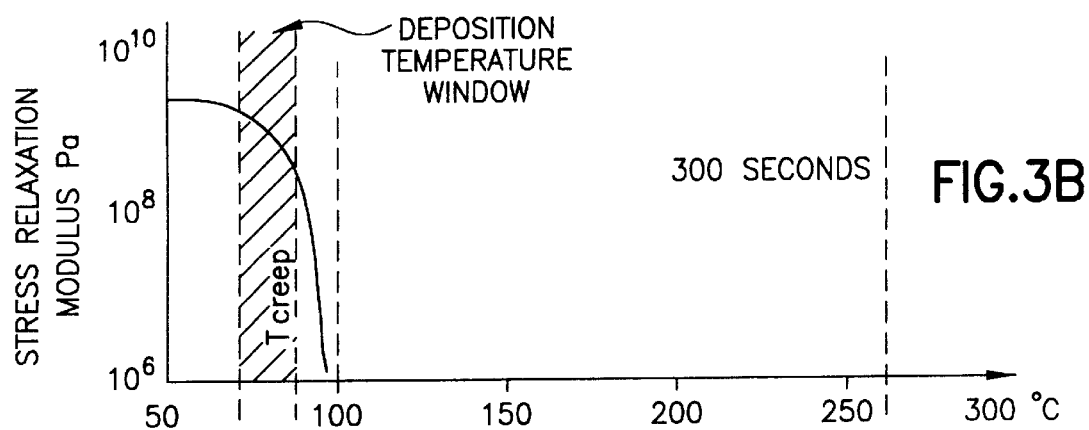
Figure 3C:
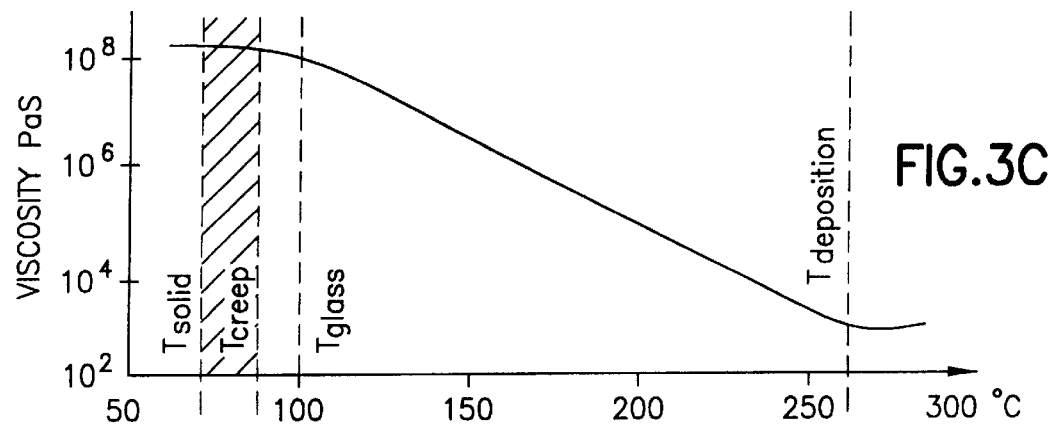

FIGS. 3A–3C show three graphs of temperature versus material properties of an ABS thermoplastic. FIG. 3A shows the variation of density of ABS with temperature at one atmosphere. The plot is nearly piece-wise linear, and the place where the two lines meet (i.e., point X) is the glass transition temperature for the material. This point is roughly equivalent to the melting point of a crystalline solid.

FIG. 3B illustrates the variation of the stress relaxation modulus of an ABS thermoplastic 300 seconds after stress is applied. This data is produced on a commercial rheometer by applying a fixed strain to a test part and measuring the time evolution of the stress. Practically speaking, this is an effective method for determining at what temperature the material is a solid. 300 seconds was chosen, after application of an initial strain, as a reasonable interval because it is typical for a deposition time of a layer. If a rapid prototyping method has a deposition rate that is substantially different, the time for acquiring the stress relaxation data should be changed accordingly.

FIG. 3B shows that ABS has very little creep over 300 seconds, for temperatures up to about 70° C. This temperature is therefore defined as the solidification temperature. The creep rate increases, at first gradually and then abruptly, as the glass transition temperature is reached. By the time the material is at the glass transition temperature, it will not support an applied stress over an extended time period (while over a time period on the order of a second, it still appears somewhat stiff).

Labeled as the creep relaxation temperature is the point at which the stress relaxation modulus has dropped by a factor of 10 from its low temperature limit. At that point the material is just sufficiently solid that modeling can occur, however the material has a high enough creep rate that internal stresses can relax without impacting part geometry.

FIG. 3C shows the variation of viscosity of ABS with temperature. The plot indicates that the deposition temperature needs to be in the vicinity of 270° C. for the material to be sufficiently flowable to be sequentially deposited to build up a part. Further, the material undergoes a substantial density change as it solidifies, which leads to the mechanical distortions discussed earlier. Finally, FIG. 3C makes it clear that viscosity is not a sufficient measure of flowability to determine at what temperature the material is a solid.

It has been determined that by maintaining a previously deposited material (in a rapid prototyping system utilizing thermal solidification) within a specific temperature window, that stresses present in the deposited material are relieved and geometric distortions reduced. At least in the vicinity of where newly deposited material will be applied, the previously deposited material must be maintained at a temperature that is preferably in a range between the material's solidification temperature and its creep relaxation temperature. More preferably, the temperature should be maintained closer to the creep relaxation temperature. In the case of ABS, the temperature window falls between approximately 70° C. and approximately 90° C. In general, an entire build layer (outside of the immediate region of the extrusion nozzle) should be maintained above the material's solidification temperature and below the material's creep relaxation temperature.

The aforementioned temperatures are identified from stress relaxation measurements on sample blocks of the material. By maintaining the temperature of the resulting model within the aforesaid range, a balance is struck between the model being so weak that it droops and the model being so stiff that curl stresses (as described above) cause geometric distortions. Further, inherent stresses are allowed to relax, leading to more dimensionally accurate models.

While it is necessary for the previously deposited material, in the vicinity of newly deposited material, to be at a temperature within the aforesaid deposition temperature window, it is not required for the entire deposited part to within that window. As prescribed by equation 2 above, regions of the previously deposited material can be below the defined solidification temperature as long as the thermal gradient within those regions is less than that required to meet a defined accuracy specification.

Once the entire prototype model has been completed, it needs to be cooled so that it is everywhere below the material's solidification temperature, before it is handled or significantly stressed. The cooling rate should be slow enough that the thermal gradient limit set by equation 2 is not violated.

Figure 4:
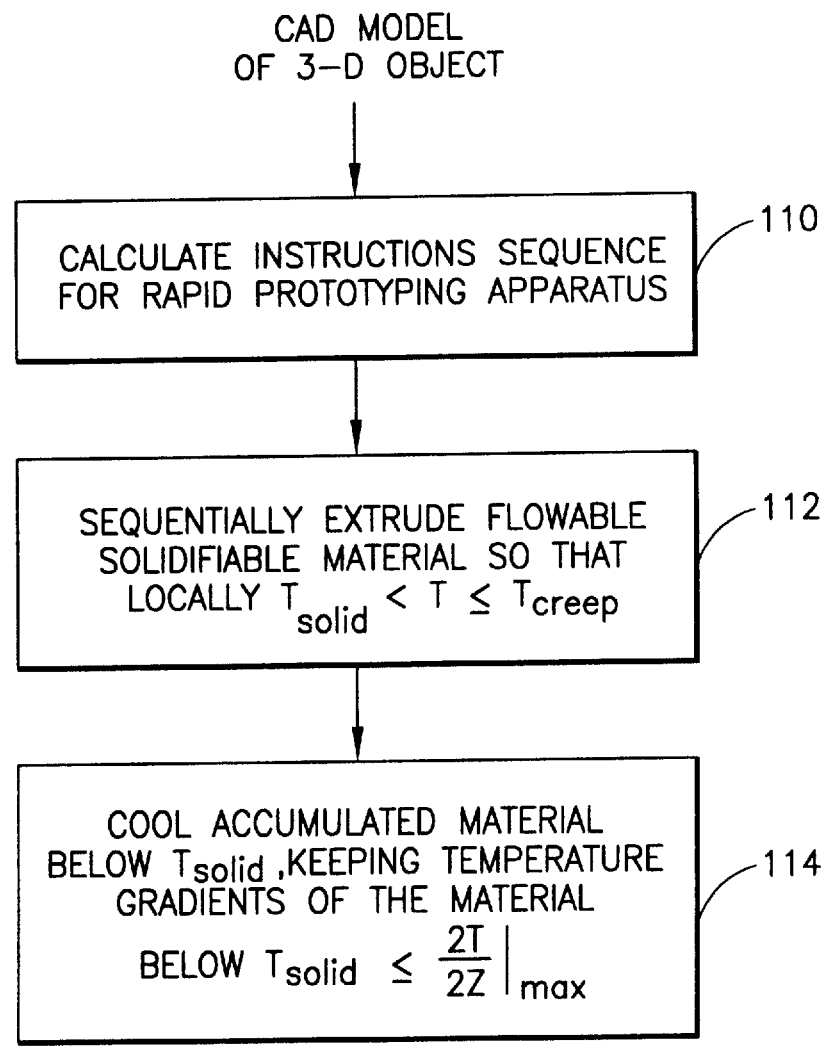
FIG. 4 is a process flow diagram for a rapid prototyping system incorporating the method of the invention.

FIG. 4 shows a preferred process of building prototypes in accordance with the invention. Data corresponding to the desired shape of the prototype is transmitted to the rapid prototyping system. The system calculates a sequence for extruding flowable material that thermally solidifies so as to create the described geometric shape (box 110). A heated flowable modeling material is then sequentially extruded at its deposition temperature into a build environment that maintains the build volume in the vicinity of the newly deposited material in a deposition temperature window defined by the material's solidification temperature and it's creep temperature (box 112). Calculation step 110 need not be completed before deposition step 112 begins.

The newly extruded material is thereafter gradually cooled below the material's solidification temperature while maintaining temperature gradients below a maximum value set by the desired part's geometric accuracy (box 114).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for making a three-dimensional physical object of a predetermined shape under control of a control system, said method employing a thermally solidifiable material having a solidification temperature and a creep relaxation temperature, said method comprising the steps of:
    a) dispensing said thermally solidifiable material in a fluid state from an extruder into a build region having at least a local region temperature that exceeds the solidification temperature of the thermally solidifiable material;
    b) simultaneously with the dispensing of the said thermally solidifiable material, and in response to said control system, generating relative movement between the extruder and a support in the build region, so that the said thermally solidifiable material accumulates on said support to form a three-dimensional physical object; and
    c) solidifying said thermally solidifiable material by cooling said local region temperature and said material below the solidification temperature of the material.

2. The method of claim 1, wherein the thermally solidifiable material is a thermoplastic which exhibits a glass transition temperature.

3. The method of claim 2, wherein the local region temperature of the build environment, at least during step b), is below the glass transition temperature.

4. The method of claim 1, wherein the creep temperature is a point at which the stress relaxation modulus of the thermally solidifiable material has dropped by a factor of 10 from its low temperature limit.

5. The method of claim 1, wherein the local region encompasses at least a most recently deposited layer of said thermally solidifiable material.

6. The method of claim 5, wherein the local region temperature of the build environment is maintained, at least during step b), below the creep relaxation temperature of said thermally solidifiable material.

7. The method of claim 1, wherein concurrent with said cooling of said local region and said material below the solidification temperature of the material during step c), a rate of temperature change versus position in the said physical object is maintained below a threshold value.

8. The method of claim 1, wherein the thermally solidifiable material is acrylonitrile-butadiene-styrene.

9. A method for making a three-dimensional physical object of a predetermined shape comprising the steps of:
    a) computing a sequence of commands required to produce said predetermined shape of the three-dimensional physical object;
    b) dispensing a thermally solidifiable material in a fluid state from an extruder into a build environment as prescribed by the sequence of commands;
    c) maintaining during step b) the build environment, at least in a vicinity of the extruder, within a predetermined temperature range, said temperature range being above a solidification temperature of the thermally solidifiable material;
    d) simultaneously with the dispensing step b) and in response to the sequence of commands, mechanically generating relative movement between the extruder and the build environment, so that the said material accumulates to form the three-dimensional physical object;
    e) concurrently with step d), adjusting temperatures within the build environment differentially so that the solidifiable material, upon which additional solidifiable material has accumulated, is cooled below a solidification temperature thereof; and
    f) further solidifying the said object by cooling said object below said solidification temperature.

10. The method of claim 9, wherein the thermally solidifiable material is a thermoplastic which exhibits a glass transition temperature and step c) maintains the temperature of the build environment below the glass transition temperature.

11. The method of claim 9, wherein the thermally solidifiable material is acrylonitrile-butadiene-styrene.

* * * * *